UNITED STATES PATENT OFFICE.

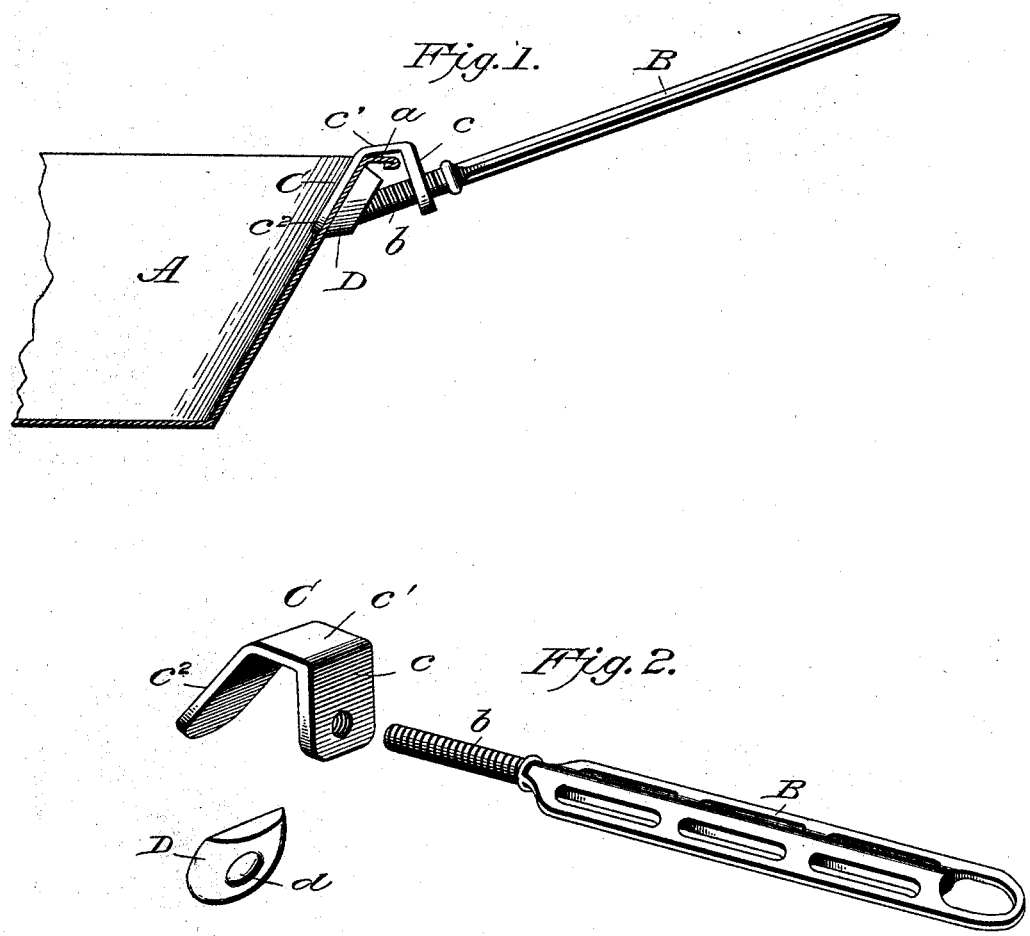

CHARLES H. HOMMEL, OF SAYVILLE, NEW YORK.

DETACHABLE HANDLE FOR PANS, &c.

SPECIFICATION forming part of Letters Patent No. 509,738, dated November 28, 1893.

Application filed August 24, 1893. Serial No. 483,961. (No model.)

*To all whom it may concern:*

Be it known that I, CHARLES H. HOMMEL, a citizen of the United States of America, residing at Sayville, in the county of Suffolk and State of New York, have invented certain new and useful Improvements in Detachable Handles for Pans, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in detachable handles for pans, culinary vessels and the like.

The object of the invention is to provide a handle which can be readily attached to a vessel and detached to facilitate handling the same; and it consists in the combination of a handle having a screw-threaded tang which engages with a threaded aperture in a block having an angular or inclined portion opposite the threaded aperture, the end of the tang being adapted to bear against a block having a recess therefor, as will be hereinafter fully set forth and particularly pointed out in the claims.

In the accompanying drawings, forming part of this specification, Figure 1 is a side elevation showing my improvement applied to a pan, and Fig. 2 designates detail perspective views of the parts detached.

A designates a pan or other vessel, and $a$ a bead which is located near the upper edge of the same.

B designates the handle which is provided at one end with a tang $b$ having screw-threads and a rounded end. The grasping portion of the handle may be of any suitable construction.

C designates a clamping-plate preferably made up of a single piece of material and is provided with a portion $c$ having a screw-threaded aperture to receive the tang of the handle. The portion $c$ extends at right angles with the handle and is provided with a continuation $c'$ which is parallel with the handle and from which extends a portion $c^2$ which is adapted to lie over the edge of the pan or other vessel to which the implement is applied. The tang is of sufficient length so that when the implement is applied to a vessel it will engage with the side thereof and hold the handle in rigid engagement with said vessel.

D designates a block which is provided on one side with a straight surface and on the other side with a recess $d$, said block being employed when the handle is attached to vessels made of light material, as tin, so that the end of the tang will not bear directly against said vessel. It will be observed that the upper end of the block will lie below the bead of the vessel when the implement is applied.

The implement hereinbefore described is simple and can be cheaply manufactured.

Having thus described my invention, I claim—

1. In a detachable handle for the purpose set forth, the combination, of a handle having a threaded end, a block having a threaded aperture through which the threaded end of the handle passes, and an extension of the block which is bent downward so as to be located opposite the threaded end of the handle, substantially as shown, and for the purpose set forth.

2. In combination with a handle having a threaded end or tang, a plate or block C having portions $c$ and $c^2$ connected as shown, one of which is provided with a threaded aperture to receive the tang, and a block D having a plain face and a recess in which the tang bears, substantially as shown.

In testimony whereof I affix my signature in presence of two witnesses.

CHARLES H. HOMMEL.

Witnesses:
 JNO. Z. O'BRIEN,
 OTTO P. GOTTWALD.